United States Patent [19]
Akune et al.

[11] 3,912,577
[45] Oct. 14, 1975

[54] METHOD AND APPARATUS FOR TREATMENT OF LIQUID WASTES

[75] Inventors: Mikio Akune, Yokosuka; Kokichi Yoshii, Shibukawa, both of Japan

[73] Assignee: Nittetsu Chemical Engineering Co., Ltd., Tokyo, Japan

[22] Filed: Apr. 5, 1974

[21] Appl. No.: 458,064

Related U.S. Application Data

[62] Division of Ser. No. 149,667, June 3, 1971, Pat. No. 3,847,713.

[30] Foreign Application Priority Data

June 20, 1970 Japan.................... 45-55692

[52] U.S. Cl. ......... 159/4 A; 159/16 A; 159/47 WL; 261/112; 159/4 MS
[51] Int. Cl.². B01D 1/14; B01D 47/00; B01D 1/16; B01D 1/100
[58] Field of Search..................... 423/207, 208, 209

[56] References Cited
UNITED STATES PATENTS

| | | | |
|---|---|---|---|
| 2,155,633 | 4/1939 | Bacchi................... | 23/275 |
| 2,249,192 | 7/1941 | Titlestad et al...................... | 23/307 |
| 2,303,811 | 12/1942 | Badenhausen......................... | 23/262 |
| 2,325,566 | 7/1943 | Wiley et al............................ | 23/307 |
| 2,354,175 | 7/1944 | Wilcoxson............................. | 23/262 |
| 2,524,753 | 10/1950 | Betts....................................... | 23/48 |
| 2,614,652 | 10/1952 | Sultzer............................. | 23/272 X |
| 2,839,122 | 6/1958 | Laguiharre.......................... | 159/4 A |
| 2,936,215 | 5/1960 | Hochmuth.............................. | 23/48 |
| 3,053,615 | 9/1962 | Steinert............................ | 159/4 A X |
| 3,153,609 | 10/1964 | Markant et al........................ | 162/36 |
| 3,275,062 | 9/1966 | Williams............................... | 159/4 A |
| 3,309,262 | 3/1967 | Copeland et al...................... | 162/30 |
| 3,322,181 | 5/1967 | Williams.............................. | 159/4 A |
| 3,439,724 | 4/1969 | Mason................................ | 159/13 C |
| 3,560,329 | 2/1971 | Nelson et al...................... | 162/30 X |
| 3,638,708 | 2/1972 | Farin................................ | 159/4 A X |

*Primary Examiner*—Jack Sofer

[57] ABSTRACT

A method and apparatus are provided, wherein liquid waste containing a mixture of organic and inorganic materials or organo-metallic compounds is, in turn, dehydrated, concentrated, combusted and the ash produced therefrom is recovered in the form of an aqueous solution or a slurry.

According to the above method, the high temperature combustion exhaust gases are injected into water in a recovery vessel and the ash entrained therewith is recovered as an aqueous solution or a slurry, and the heat contained in the liquid waste as well as the heat evolved from the auxiliary combusting fuel are recovered in the form of steam which contains non-condensable gases and are utilized in the concentration of additional liquid waste under a reduced pressure.

2 Claims, 2 Drawing Figures

METHOD AND APPARATUS FOR TREATMENT OF LIQUID WASTES

This is a division of application Ser. No. 149,667 filed June 3, 1971, now U.S. Pat. No. 3,847,713.

BACKGROUND

The present invention relates to a method wherein liquid waste containing a mixture of organic and inorganic substances or organic metallic compounds is, in turn, dehydrated, concentrated and combusted and the ash produced therefrom is recovered as an aqueous solution or a slurry.

In general, it is known that the temperature at which the organic materials can be burned should be of the order of 800°C or above.

Where the liquid waste contains small amounts of organometallic substances, such as for example sodium carboxylate, it is required to evaporate a great amount of water and to raise the combustion temperature to well over 800°C, thus consuming a great amount of auxiliary combustion fuel. In this case, it is not advantageous, from a heat economy viewpoint, to exhaust to the atmosphere combustion gases having a temperature as high as 800°C. Furthermore, this may create a secondary atmospheric pollution problem, that is, sodium carbonate released during the combustion could be contained in the exhaust gases in the form of fine particles.

It has now been found that considerable savings in the consumption of the auxiliary combustion fuel can be attained by combusting the liquid waste at a temperature greater than 800°C, after said waste has been dehydrated and concentrated and the water content has been substantially reduced.

It has further been found that the partial utilization of the heat contained in the combustion exhaust gases for concentrating additional liquid waste will contribute to greater savings in auxiliary combusting fuel, because of the exhaust gases considerable temperature, and in the volume of the furnaces required.

SUMMARY

An object of the present invention is to provide a method and a system for treating liquid waste containing a mixture of organic and inorganic substances or organo-metallic compounds by, in turn, dehydrating, concentrating and combusting it and recovering the ash produced therefrom as a slurry and utilizing the high temperature combustion exhaust gases for concentrating additional waste.

A further object of the present invention is to provide a method and system for treating liquid waste, wherein the heat evolved from the waste and from the auxiliary fuel is recovered in the form of steam, which is then utilized for reducing the water content of the waste, thus saving in auxiliary fuel consumption.

These and other objects of the present invention will be apparent from the following description.

According to the present invention, a part of the combustion exhaust gases having temperatures of over 800°C is directly injected into a water-containing recovery vessel and any inorganic substance and any ash such as sodium carbonate contained in the exhaust gases are recovered in the form of a slurry, while the remaining part of the exhaust gases is directly contacted with the waste to evaporate the water in the waste and concentrate it. As a result the heat contained in the exhaust gases may partly be directly utilized for such purposes in an efficient manner.

A first embodiment of the present invention provides therefore a method wherein the high temperature combustion exhaust gases are divided into two parts, one of which is injected into a recovery vessel to recover the ash in the form of an aqueous solution or a slurry, and the other is injected into the waste to concentrate the same prior to combusting it.

As an alternative it is possible to recover an even greater part of the solid content of the combustion gases in the form of an aqueous solution or a slurry by directly injecting the combustion exhaust gases into the recovery vessel in the form of foams.

When the combustion gases are injected into the recovery vessel, they liberate and give up their heat to the water during their refloating movement to the water surface, thereby evaporating a great amount of water, and therefore they can be discharged together with a great amount of steam.

Considering for example, the case where the concentration of recovered sodium carbonate solution is desired to be 15 percent, the water to be supplied should consist of the water and steam necessary to obtain said 15 percent sodium carbonate solution. In a method where the combustion gases are directly injected into water, there may take place a decrease in the boiling point of the exhaust gases issuing from the 15 percent sodium carbonate solution, because they contain non-condensable gases such as a nitrogen or carbon dioxide, the temperature being in the range of 85° to 95°C.

The exhaust gases of this kind contain about 60 percent steam therein, thus affording considerable heat economy when utilized for concentrating the waste.

It is also feasible to concentrate the waste by means of an evaporator incorporating a heat exchanger in which the heat conduction takes place through indirect contact of the waste with the exhaust gases which contain about 60 percent steam.

At normal atmospheric pressure, it is impossible to effect the concentration of the waste, because the temperature of the exhaust gases is lower than the boiling point of the waste. Therefore, to effect the concentration, it is necessary to reduce the pressure of the waste by means of vacuum devices such as a water or steam ejector.

The liquid waste, after concentration by reduction of its water content, is then supplied to a combustion furnace, whereby the auxiliary fuel consumption is greatly reduced.

In general, although dependent on the kinds of solutes, when the concentration of a solution containing a mixture of organic and inorganic materials and/or organo-metallic compounds falls in the range of 40 to 60 percent, a slurry will result or the viscosity of the solution will increase considerably thus preventing spraying or injection of the solution into a furnace. Therefore, it is important to hold the concentration of the solution within a range which permits its continuous injection in the furnace. This is done by adjusting the degree of vacuum.

It is advantageous to scrub the exhaust gases exiting from the concentrator before discharging to the atmosphere, because of the possible presence of polluting solid particles entrained therein.

DETAILED DESCRIPTION

Figure 1:
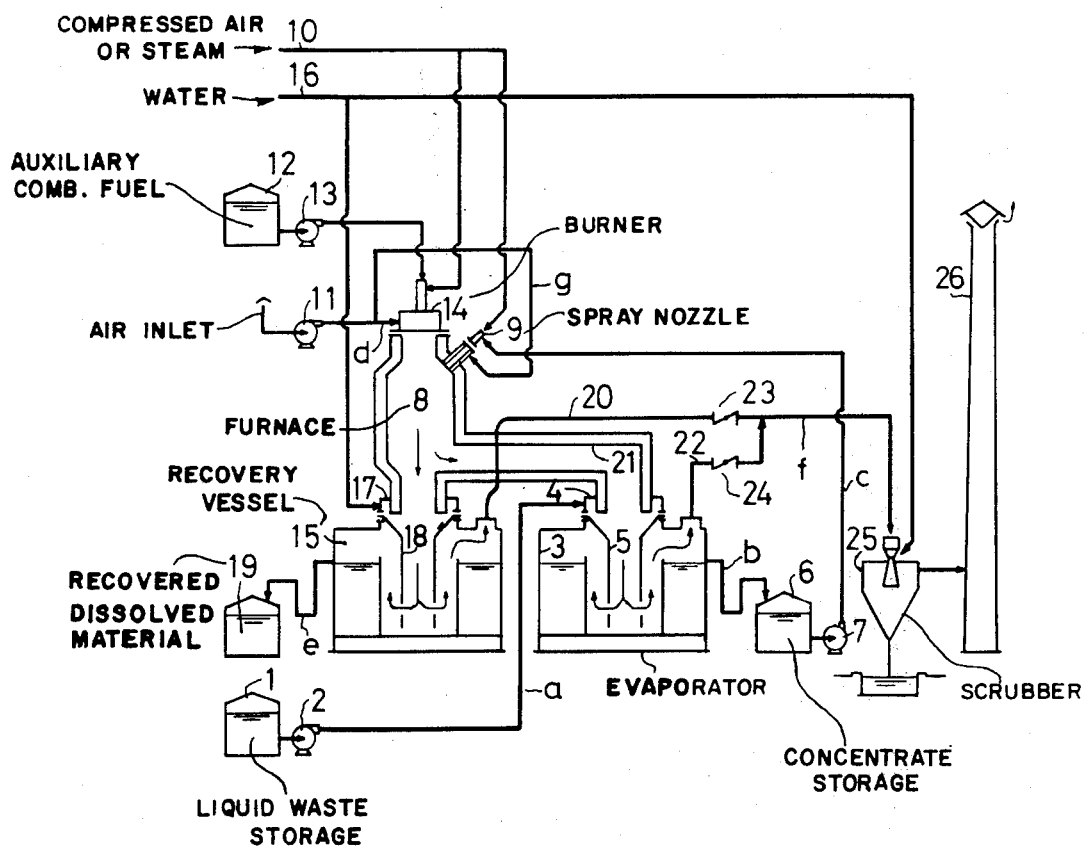
Figure 2:
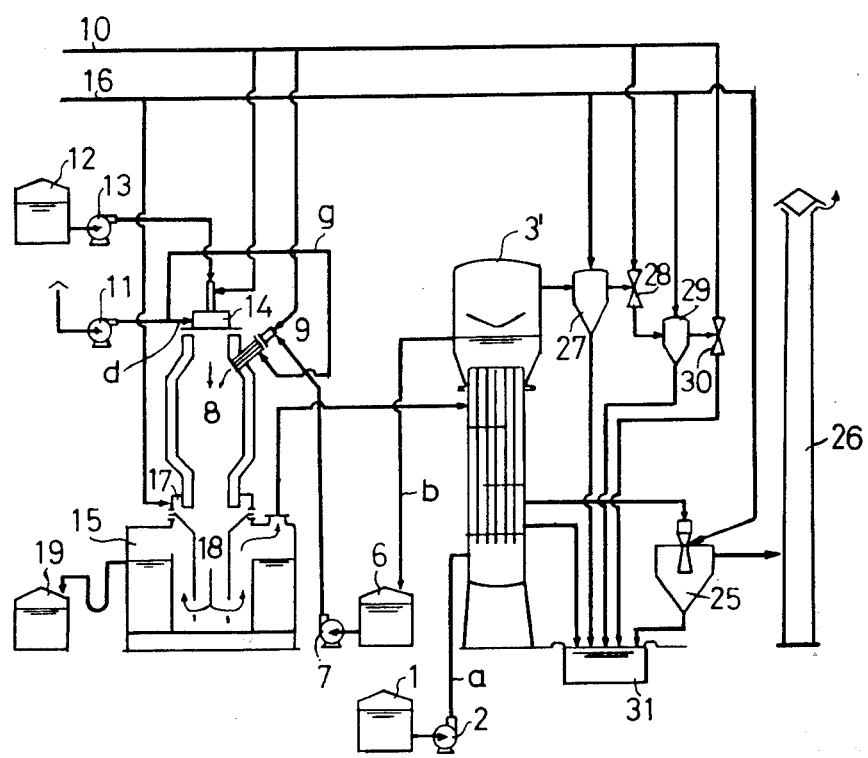

The following description of the invention is given with reference to the accompanying drawings, in which:

FIG. 1 is a flow diagram of a first embodiment of the invention showing a liquid waste treatment system according to this invention; and FIG. 2 is a flow diagram of another embodiment of the present invention.

In the drawings, like reference characters designate similar parts.

Referring now to FIG. 1, a liquid waste storage tank 1 is in fluid communication via pump 2 and pipe a with a jacket 4 provided in the upper portion of a concentrator or evaporator 3. Provided in the interior of the evaporator 3 is a downcomer 5 to which the waste is introduced. The overflow of the concentrated solution from the evaporator 3 is delivered into a concentrated solution storage tank 6 by way of pipe b. A pump 7 conveys the concentrated solution from storage tank 6 via pipe c to a spray nozzle 9 provided on combustion furnace 8. Compressed air or steam under a medium pressure is introduced into the nozzle 9 via conduit 10 to accelerate the combustion of organic substances in the waste and the evaporation of the water contained therein.

A blower 11 is provided so as to supply to combustion furnace 8 the air required for combustion of the waste concentrate, said blower being connected by way of a pipe d with a burner 14 and by way of a pipe g to the spray nozzle 9. The auxiliary combustion fuel is contained in a storage tank 12, and via pump 13 is delivered to burner 14 mounted on the furnace 8. Beneath the furnace 8 is a recovery vessel 15 to receive the combustion exhaust gases produced. A downcomer 18 is disposed inside the recovery vessel, which is provided also with a header 17 through which water introduced via pipe 16 is supplied to the recovery vessel 15.

The recovery vessel 15 is connected to a recovered waste storage tank 19 through a pipe e, and the combustion gases are exhausted through a duct 20 located in the upper portion of the recovery vessel.

Approximately one-half of the combustion gases discharged from the furnace 8 is delivered via duct 21 to downcomer 5 to heat the waste delivered by jacket 4. Connected with the evaporator 3 is a duct 22 to discharge the combustion gases from the evaporator. Valves 23 and 24, provided in ducts 20 and 22, which ducts join in f, serve to adjust the volume of the combustion gases being delivered to the evaporator 3. Scrubber 25 is in communication with an exhaust tower 26 and with a water supply via pipe 16.

Turning now to FIG. 2 which shows another embodiment of the present invention, the evaporator 3 concentrates the waste delivered by pump 2. Storage tank 6 connected with the evaporator by pipe b contains therein the waste concentrate overflowed from said evaporator.

In this embodiment, all the combustion gases from the furnace 8 are directed to the downcomer 18 in the recovery vessel 15 and then supplied to evaporator 3 by way of an overhead pipe. In communication with evaporator 3 is a condenser 27 to condense the steam evaporated from the waste in the evaporator. Condenser 27 is connected to another condenser 29 by way of an ejector 28. The condenser 29 is similarly connected to an ejector 30. Condensers 27 and 29 and ejector 30 each communicate with a sewerage tank 31 where the condensed water is introduced. The ejectors 28 and 30 each communicate with a duct 10, and the condensers 27 and 29 are connected to water pipe 16.

OPERATION OF THE SYSTEMS

In operation, the liquid waste contained in storage tank 1 is delivered by pump 2 to the downcomer 5 via jacket 4 provided on the upper portion of the evaporator 3 and then concentrated therein, and delivered to the waste concentrate storage tank 6. The concentrate from the storage tank 6 is delivered by pump 7 to the spray nozzle 9 mounted on the furnace 8 and then spray-injected into the furnace for burning. It is preferable to use steam or compressed air as the atomizing source necessary for spraying. The compressed air is led through duct 10 to accelerate the combustion rate of the organic substances contained in the waste as well as the evaporation rate of the water in the concentrate.

The air necessary to support the combustion of the organic substances is supplied by the blower 11 and the auxiliary combustion fuel from storage tank 12 is supplied by pump 13 to the burner 14 of furnace 8.

In the event that the waste has self-sustaining combustibility, the auxiliary fuel is not required, but in general, aqueous solutions such as the waste of carboxylic acid solution do not provide self-sustaining combustibility, thus requiring the auxiliary fuel. It is possible to make the furnace size compact and maintain a stable flame by using a high-load short-flame burner. The temperature of the flame from the auxiliary fuel burner is as high as 1600° to 1800°C, so that it may effect a rapid evaporation of the water as well as a complete combustion of the organic substances contained in the waste.

It is commonly accepted that the organic materials, in general, can be burned completely at a temperature of over 800°C. On combustion of the waste, the metallic compounds contained in the waste may be obtained as ash and if sodium carbonate is present, this will be released as a portion of the ash. The melting point of the sodium carbonate being about 850°C, the molten sodium carbonate tends to adhere to the inner surface of the furnace when combustion is carried out at a temperature below 850°C, thus causing clinkers.

In this case, therefore, the combustion temperature should be set at about 950°C. In case of inorganic materials such as sodium chloride, the melting point of the ash will be considerably lower, and thus no damage to the furnace will occur, when combusting at 850°C.

One half of the combustion gases thus produced is injected into the recovery vessel 15 and the remaining half is injected into the evaporator 3. Water is then supplied to the recovery vessel from the downcomer 18 via water pipe 16 and header 17.

Most of the sodium carbonate produced during combustion flows in the molten state along the inside of the furnace walls into the recovery vessel 15 and goes then into solution. Part of the sodium carbonate, in the form of particles, is entrained with the combustion gases into the recovery vessel directly. In this manner, 90% or more of the sodium carbonate may be absorbed into solution in the recovery vessel.

The combustion gases are injected into the recovery vessel at about 950°C and then discharged therefrom through duct 20 at a temperature of 90° to 100°C.

As an illustrative example, the rate of flow of waste used with such a system contained a mixture of, inter alia, organic materials (1320 lbs/hr), caustic soda (572 lbs/hr) and water 7788 lbs/hr), for a total flow of 9680 lbs of waste/hr with a calorific value of about 7215 BTU/lb.

The rate of the sodium carbonate produced during the combustion of the waste was 759 lbs/hr and about 682 lbs/hr of the sodium carbonate was absorbed in the recovery vessel. This means that about 5500 lbs/hr of water was evaporated in the recovery vessel. To obtain 10 percent sodium carbonate solution in the recovery vessel, about 11,660 lbs/hr of water should be supplied thereto to obtain about 6820 lbs/hr of 10 percent solution of sodium carbonate.

The sodium carbonate solution thus recovered is stored in a recovery solution storage tank 19 for other applications.

On the other hand, the remaining one-half of the combustion exhaust gases in injected into the evaporator 3 through duct 21.

With the waste being injected into the evaporator through jacket 4, the waste is brought into contact with the combustion gases. This effects the evaporation of the water contained in the waste, and the waste may be thus concentrated. At this stage, 5500 lbs/hr of water is evaporated, and 4180 lbs/hr of the concentrate may be stored in the storage tank 6.

As shown in FIG. 1, if a part of the combustion gases is bypassed to the evaporator, a majority of the sodium carbonate produced in the furnace will be led into the recovery vessel 15, so that the amount of the particulated sodium carbonate contained in the combustion gases and eventually introduced into the evaporator, will be greatly reduced, thereby precluding the carbonate from accumulating in the concentrated waste.

The control in the concentration of the waste can be effected by adjusting both valve 23 in duct 20 and valve 24 in duct 22. The volume of the combustion gases to be injected into the evaporator is thus also eventually adjusted.

If the combustion gases are entirely injected into the waste to concentrate it, the sodium carbonate produced in the furnace will be entirely dissolved in the waste, thereby raising the concentration of sodium carbonate therein which, in turn causes the formation of crystals and leads to the formation of a slurry. This will prevent the waste from being readily pumped to the furnace and will interrupt the normal combustion therein.

To maintain a continuous concentration by means of direct contact between high temperature exhaust gases and the waste, it would be necessary to inject a part of the exhaust gases into an aqueous solution, e.g., water, rather than directly into the waste, while the remaining gases are injected in the waste for concentration purposes.

As it may be apparent from the system of the embodiment shown in FIG. 2, the furnace may be mounted vertically or horizontally on the recovery vessel for ease of injecting molten ash together with combustion gases into the recovery vessel and to impart an improved fluidity to the molten salts.

The inner surface of the downcomer 18 for the combustion gases is automatically cooled with the liquid passing exteriorly of said downcomer. Consequently, the ash tends to adhere to said inner surface. For this reason, it is contemplated that the water to be supplied to the recovery vessel be led to the inner side of the downcomer 18 through header 17 so as to dissolve the salts with water.

The fine particles of sodium carbonate particles which have been melted and adhered to the inner surface of the furnace, are injected into the recovery vessel together with the combustion gases via downcomer 18, so that most of the sodium carbonate, or ash, is absorbed into solution in the recovery vessel. The solution from the recovery vessel is then delivered to the recovered liquid storage tank 19, with the concentration thereof being adjusted by adding water thereto so as to provide a desired degree of sodium carbonate solution or of ash solution or of slurry.

On the other hand, the exhaust gases which have given up their heat to the solution in the recovery vessel, together with the steam thus produced, are introduced into the evaporator for concentrating additional waste.

As a further illustrative example, a system was employed with a 11,000 lbs of waste/hr. The concentration of the solute was 20 percent and the major components to be treated were sodium carboxylate and inorganic materials, the lower calorific value based on anhydride being 5035 BTU/lb.

In this case, the rate of the steam produced from the recovery vessel was about 11,000 lbs/hr.

During combustion of the concentrated waste in the furnace, 2640 lbs/hr of water corresponding to the entire water contained in the concentrate was evaporated and the steam to atomize the waste amounted to 1760 lbs/hr, so that the steam contained in the exhaust gases discharged from the recovery vessel was 15,400 lbs/hr.

The heat contained in this steam was utilized in evaporating the water contained in the waste, and 6160 lbs/hr of steam were yielded in the evaporator for use in concentrating. The steam thus liberated from the waste was then introduced into the condenser (27) and condensed into water.

Since the exhaust gases, as a heat source, contain noncondensable gases and have a temperature as low as about 90°C, it was necessary to maintain the pressure on the surface of the waste in the evaporator as low as 100 to 300 mm/Hg abs. For this reason, steam ejectors 28 and 30 as well as condenser 29 are used. The vacuum devices 27 – 30 were water ejectors.

A volume of steam almost as great as that of the steam liberated from the waste, was produced from the exhaust gases in the evaporator and then discharged into the sewerage 31. In this manner, the waste from the evaporator was condensed to a 45 percent solution, and then delivered to the spray nozzle 9 from storage tank 6.

It will be appreciated that the present invention provides an efficient waste treatment method and system, wherein high temperature combustion exhaust gases are injected into water and the ash produced is recovered in the form of an aqueous solution or a slurry, and, most important, the heat contained in the waste as well as the heat evolved from the auxiliary fuel are recovered as steam which contains non-condensable gases, whereby the heat of said steam is utilized for concentrating additional waste under a reduced pressure.

What is claimed is:

1. A method for treating liquid waste, which comprises the steps of:

a. providing a liquid waste containing a combustible mixture or organic and inorganic or organo-metallic materials, said materials after complete combustion producing an alkali metal containing ash;
b. concentrating said waste in an evaporator under reduced pressure;
c. injecting and atomizing the thus concentrated waste into a vertical furnace through a spray nozzle at the upper portion of said furnace;
d. combusting said injected and atomized waste in said vertical furnace at least above 800°C and above the fusion temperature of the thus produced ash; and
e. introducing the upper laden combustion gases evolved from said vertical furnace into said evaporator to utilize the heat contained in said combustion gases by indirect heat exchange with said liquid waste.

2. A system for treating liquid waste which contains a mixture of organic and inorganic or organo-metallic materials, which comprises:
a. an evaporator to concentrate said liquid waste; under reduced pressure
b. a furnace for combusting said concentrated liquid waste;
c. a spray nozzle on said furnace to spray said concentrated waste into the combustion gases;
d. a burner on the upper portion of said furnace for burning auxiliary combustion fuel;
e. a recovery vessel to collect the ash contained in the dried material and entrained in the combustion gases evolved from said furnace, said gases contacting water in said vessel for dissolution of the dried material;
f. a duct connected at one end to said recovery vessel and at the other end to said evaporator, whereby said vapor laden combustion gases are conveyed from said recovery vessel to said evaporator whereby said combustion gases are conveyed from said recovery vessel to said evaporator for indirect heat exchange therewith.
g. means for introducing compressed air to said spray nozzle to atomize said injected waste and to accelerate the rate of combustion and evaporation thereof; and
h. a condenser and an ejector connected to said evaporator to condense the steam evolved from said waste in said evaporator.

* * * * *

UNITED STATES PATENT OFFICE
CERTIFICATE OF CORRECTION

PATENT NO. : 3912577
DATED : October 14, 1975
INVENTOR(S) : MIKIO AKUNE and KOKICHI YOSHII It is certified that error appears in the above—identified patent and that said Letters Patent are hereby corrected as shown below:

In claim 1, column 7, line 15 "upper" should read --vapor--.

In claim 2, column 7, lines 23-24 should read:

--a. an evaporator to concentrate said liquid waste under reduced pressure;--

In claim 2, column 8, lines 15-16, the words "whereby said combustion gases are conveyed from said recovery vessel to said evaporator" should be deleted from the claim.

UNITED STATES PATENT OFFICE
CERTIFICATE OF CORRECTION

PATENT NO. : 3912577
DATED : October 14, 1975
INVENTOR(S) : MIKIO AKUNE and KOKICHI YOSHII It is certified that error appears in the above-identified patent and that said Letters Patent are hereby corrected as shown below:

In claim 2, column 7, lines 23-24 should read

--a. an evaporator to concentrate said liquid waste under reduced pressure;--

In claim 2, column 8, lines 15-16, the words "whereby said combustion gases are conveyed from said recovery vessel to said evaporator" should be deleted from the claim.

Signed and Sealed this

Fourteenth Day of September 1976

[SEAL]

Attest:

RUTH C. MASON
*Attesting Officer*

C. MARSHALL DANN
*Commissioner of Patents and Trademarks*